2 Sheets, Sheet 1.

J. A. Smith,
Cultivator.

No. 96,279. Patented Oct. 26, 1869.

Witnesses
John A. Ellis
Henry N. Miller

Inventor
J. A. Smith,
Per;
J. H. Alexander,
Atty.

J. A. Smith,

Cultivator.

No. 96,279.   Patented Oct. 26, 1869.

Witnesses
John A. Ellis
J. V. White

Inventor
J. A. Smith
Per.
J. H. Alexander
Atty.

UNITED STATES PATENT OFFICE.

J. A. SMITH, OF LACON, ILLINOIS.

IMPROVEMENT IN CULTIVATORS.

Specification forming part of Letters Patent No. 96,279, dated October 26, 1869.

*To all whom it may concern:*

Be it known that I, J. A. SMITH, of Lacon, in the county of Marshall and State of Illinois, have invented certain new and useful Improvements in Cultivators; and I do hereby declare that the following is a full, clear, and exact description thereof, reference being had to the accompanying drawings, and to the letters of reference marked thereon, which form a part of this specification, in which—

Figure 1:
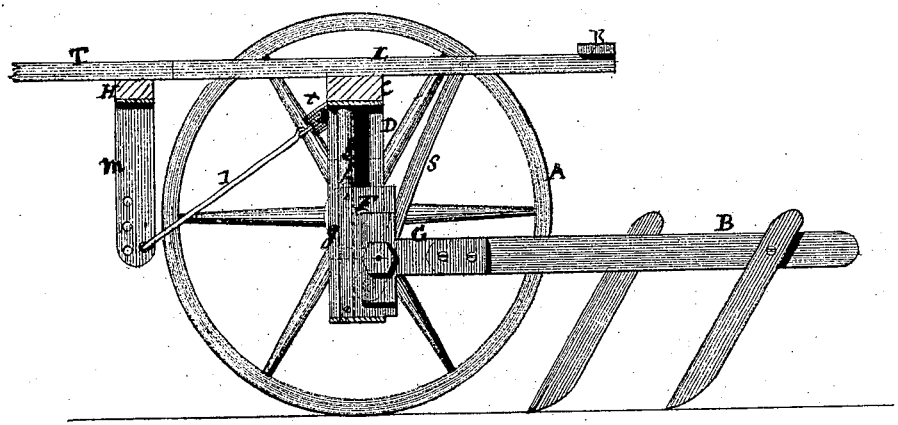
Figure 2:
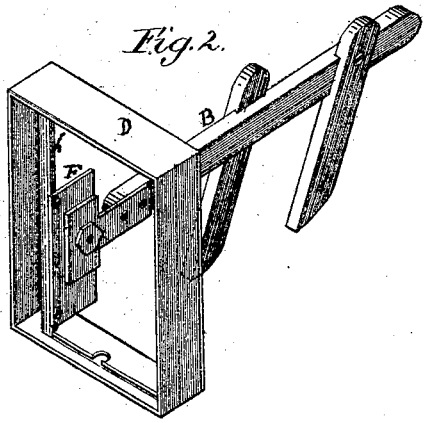
Figure 3:
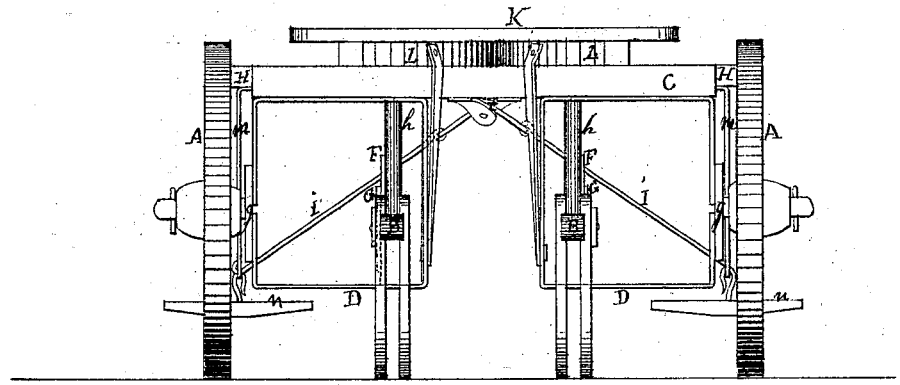
Figure 4:
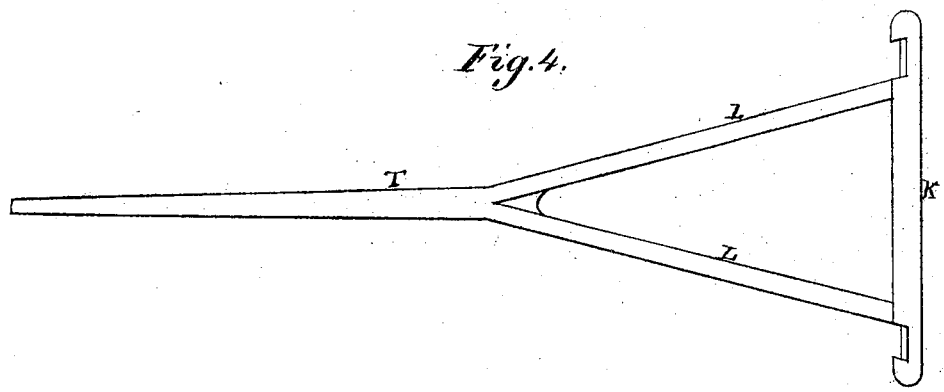

Figure 1 represents a side elevation of my cultivator, and Fig. 2 is a perspective view of one beam and the frame to which it is attached.

The nature of my invention consists in the peculiar construction of the plow-beams, and of the device to which they are attached.

It further consists in attaching vertical bars to the double-tree, so as to bring the draft in a line with the beams of the plow, in the manner set forth.

A in the annexed drawings represents the wheels; B, the plow-beams, and C the axle-tree.

D D designate two quadrangular frames, of cast-iron or other suitable material. The upper end of said frames are securely fastened to the under surface of axle-tree C in such a position as that the outer side of the frames will be flush with the ends of the axle-tree. The bottom of frames D have a slot in them extending their whole length, and also several perforations opening in said slots, the object of which will be hereinafter explained. On the outside of frames D are fastened, with screw-bolts, the plates $g$, which can be adjusted to suit the size of the wheel, as the axle or spindle on which the wheel revolves is attached to said plate $g$.

$h$ represents a cylindrical bar, the upper end of which enters a hole in the under side of axle-tree C, and the lower end rests in one of the perforations in the bottom of frame D.

F represents a metal plate, the inner edge of which is secured to bar $h$. To plate F is pivoted one end of plate G, the opposite end of G being securely fastened to beam B. The bar $h$, to which the plow-beam is thus attached, can be removed to any one of the holes in the bottom of frame D, corresponding holes being made in the upper end of said frame to receive said bar. By this arrangement the plow-beams can be moved nearer to or farther from the corn-rows, at the pleasure of the operator.

H represents the double-tree, which is pivoted to the bottom of tongue T. To each end of double-tree H is fastened the perforated metal pendant $m$.

$n$ designates the single-trees, which can be adjusted to any one of the holes in pendant $m$, so as always to bring the draft in a line with the plow-beams, and thus prevent the horse's collar from pressing unduly on the top of his neck and shoulders.

K represents a tie that rests on the hounds L. On the projecting ends of said tie an opening is made, sufficiently wide to receive the beams B, which can be elevated at their outer end and placed in said opening when the cultivator is to be removed from one part of the field to another.

S represents a brace, which binds the frames D to the hounds L.

I I represent two metal rods, one end of which is hooked into pendants $m$ and the other ends attached to a cord, which passes over a pulley, $t$, connected with axle-tree C. The rods I I serve to brace the pendants $m$ and also to govern the motion of the double-tree H.

Having thus described my invention, what I claim, and desire to secure by Letters Patent, is—

1. The frames D D, when provided with plates $g$ $g$, and adjusting-holes at top and bottom, substantially as and for the purpose described.

2. The combination of the beams B B with the vertical cylindrical bars $h$ $h$, when said bars are provided with the plates G and F, the plates being pivoted together, substantially as and for the purpose specified.

3. The double-tree H, provided with pendants $m$ $m$, in combination with rods I I or their equivalent, the said rods being connected with a pulley, $t$, on double-tree H, in the manner and for the purpose set forth.

In testimony that I claim the foregoing as my own I affix my signature in presence of two witnesses.

J. A. SMITH.

Witnesses:
 A. McKEAN,
 D. C. WALLACE.